Patented May 30, 1950

2,509,855

UNITED STATES PATENT OFFICE 2,509,855

CONVERSION OF DURENE TO CARBOXYLIC ACIDS

Leland K. Beach, Mountainside, N. J., assignor to Standard Oil Development Company, a corporation of Delaware No Drawing. Application June 19, 1948,
Serial No. 34,155

1 Claim. (Cl. 260—524)

This invention relates broadly to a process for making polybasic aromatic acids, and, more specifically, to a method for making 1,2,4,5-tetracarboxy benzene from durene.

It has long been known to oxidize certain aromatic compounds carrying alkyl side chains to yield valuable aromatic acids. Reactions of this type are commonly employed to give benzoic and phthalic acids and phthalic anhydride.

Difficulty is encountered, however, when an attempt is made to oxidize aromatic compounds of the benzene series to yield the polybasic acids having more than two carboxy groups. In liquid phase oxidation using such oxidizing agents as permanganate or chromic acid under relatively mild conditions only one alkyl group is converted to a carboxyl group. If more strenuous conditions are employed in an effort to carry the reaction further, the molecule may be partially or totally destroyed. This difficulty would definitely be expected to occur in oxidizing 1,2,4,5-tetramethylbenzene, commonly known by the name of durene, to give benzene 1,2,4,5-tetracarboxylic acid or its dianhydride.

It has now been discovered that durene can be converted to the corresponding 1,2,4,5-tetracarboxy benzene by oxidation in the vapor phase using a vanadium catalyst. The reaction is conveniently carried out in regular type oxidation equipment designed for operation in the vapor phase. There are no special corrosion problems encountered. The durene and oxygen may be exposed to a fixed bed catalyst. One convenient method is to employ the catalyst in a moving or fluid catalyst operation.

Any kind of apparatus which is particularly suitable for carrying out this type of exothermic oxidation reaction using a fluidized catalyst should be designed for efficient heat removal. One type of such an apparatus is the transfer line reactor. Into the bottom of the reaction zone the finely divided fluidized oxidation catalyst is introduced by means of a stream of inert gaseous carrying medium. The catalyst is carried upward through the reaction zone into which the durene-containing feed is also introduced. Oxygen or air may also be introduced into the reaction zone either with the catalyst or separately. The oxidized products are removed in the outlet stream from the upper portion of the reactor. After passing through the reaction zone, the catalyst particles are exposed to a stripping treatment, for example, by steam, to remove product and unreacted feed. The stripped catalyst is passed continuously through a standpipe to the lower portion of the reactor and thence is recycled to the reaction zone. This arrangement gives a valuable advantage as heat can be removed from the catalyst while it is outside the heat generating reaction zone.

The temperatures at which the reaction may be carried out are not unduly critical and will depend somewhat on other factors of operation, particularly the activity of the catalyst. In general, it has been found that temperatures between 400° C. and 600° C. are operative. Better yields are obtained by the controlling temperature to around 450° C.

The process can be carried out either with or without the presence of an oxidizing gas in the reaction zone. While air is readily available and quite satisfactory as an oxidizing agent, it is not necessary to employ air as the immediate source of oxygen. Oxygen may be introduced in the pure state although employing a non-reactive gaseous diluent is preferable. Mixtures of oxygen and a suitable diluent such as nitrogen or other non-reactive gaseous substances may be used.

It is also possible to carry out the oxidation in the absence of an oxidizing gas. Certain catalysts, in particular the vanadium oxides, may be employed as oxygen carriers, which can be enriched with oxygen in a zone completely separated from that in which the reaction occurs. This type of operation can be carried out in a variety of ways. It is particularly well adapted for use in a modified transfer line type reactor.

If oxygen is present in the reacting mixture the ratio of oxygen to hydrocarbon may be varied within certain limits. The optimum depends somewhat on other variables such as activity of catalyst, temperature, rate of passage over the catalyst, and speed of reaction desired. In most cases, when oxygen is used it seems best to maintain an excess in the reaction zone as this tends to give the desired product rather than tarry by-products. Using durene and air mixtures, the conversion to acid is higher if durene concentration in the feed is maintained in the range of about 0.1 to .05 mole percent.

The time of contact of the feed with the catalyst is advantageously of the general order of 0.1 second to 1 second. The contact time is somewhat critical especially if excessive oxidation is to be avoided.

The durene employed need not necessarily be a chemically pure compound. For example, thermally or catalytically cracked petroleum oil fractions of boiling range 185–205° C. and containing appreciable quantities of durene can be used quite satisfactorily.

The steam cracking process gives certain such fractions which contain relatively large amounts of durene. For instance a gas oil or naphtha fraction from petroleum is vaporized and mixed with steam. The oil-steam mixture is then sent to the cracking furnace. The hot cracked products which leave the furnace are quenched and sent to a primary fractionator. This fractionator separates the products into various crude cuts such as a gas stream, variously boiling distillate streams, and a tar stream. These crude fractions are then purified, dehydrated, and further fractionated into cuts having the desired boiling range. A fraction of any particular boiling range will, of course, contain certain specific compounds having corresponding boiling points. The relative amounts of such substances will depend on the feed stock being cracked. Thus for oxidation purposes a cut may be selected of such boiling range as will contain a maximum amount of durene.

Compounds in the feed which are incapable of oxidation under the reaction conditions may also be present as they are readily separated from the acidic products. Such an initial feed may also contain other hydrocarbons which are oxidizable under the conditions. This will cause no interference with the oxidation of the durene provided sufficient oxygen is supplied.

The main product recovered is the tetracarboxylic acid although it is believed that a dianhydride is initially produced. Although it is not intended to limit this process to a definite theory, it is believed that the dianhydride is first formed by the reaction but that it is probably later hydrolyzed to the acid by the water formed during the reaction.

Throughout both the specification and the claim, the term 1,2,4,5-tetracarboxybenzene is intended to include both the benzene 1,2,4,5-tetracarboxylic acid and the corresponding mono and dianhydrides.

In typical experiments, mixtures of durene and air were passed over a fixed bed of 8–12 mesh catalyst composed of approximately 10 percent vanadium pentoxide on corundum and promoted with 0.1 percent potassium sulfate, the catalyst temperature being maintained in a range of 440° to 450° C. The durene and air mixtures were passed over the catalyst bed in the proportions and rate of 2,000 to 3,000 volumes of air per volume of catalyst per hour. This represents a contact time of about 0.3 second. Durene concentrations of about 0.01 to 1.0 mole per 100 moles of air were used. The acidic product was isolated by condensation and may be further purified, if desired, by conventional methods.

The acid product recovered from the catalytic oxidation of durene was identified by obtaining the neutral equivalent in the ordinary way. This experimental value agreed well with the calculated neutral equivalent for benzene 1,2,4,5-tetracarboxylic acid.

In the above experiment, there may also be used other vanadium-containing catalysts such as those commonly employed for vapor phase oxidation reactions. These include vanadium oxide alone as a formed catalyst or suspended on gauze or other type of inert supports. The vanadium oxide may also contain other catalytic compounds such as molybdenum oxide and promoters such as various salts.

Vanadium oxide can exist in at least two stages of oxidation. Although these oxides may vary somewhat in their catalytic activity, they may be used alone or in mixtures for oxidizing the durene to the tetracarboxy benzene. A form of the catalyst which is very useful especially in reactors in which the catalyst is in motion is obtained by subjecting vanadium oxide catalysts to fusion followed by treatment to give catalysts having the shape of microspheres. Such forming treatment greatly extends the useful life of the catalyst as it tends to eliminate destructive attrition and grinding action of the catalyst particles.

Because of their peculiarly adaptable structure, benzene 1,2,4,5-tetracarboxylic acid and its dianhydride could be expected to find a great many uses as synthetic chemicals and for conversion to other intermediates. Having four carboxy groups, the acid would be particularly useful for plastic, resin, and polymer products. For instance, the tetra acid may be reacted with a glycol or other polyhydric alcohol to give a cross-linked polymer. This could of course be modified in the usual way by use of monohydric alcohols. Further, a diamine or other polyamine might be reacted with the acid to give a nylon-like material made up of amide linkages. Such polymers could be modified in known ways to improve their properties as by heat treatments, curing, plasticizers, and the like. The anhydride might be converted to the diimide by well known methods, thus making available a valuable intermediate.

What is claimed is:

A process for the preparation of 1,2,4,5-tetracarboxy benzene which comprises contacting a gasiform feed mixture of 0.01 to 1 mol percent of 1,2,4,5-tetramethyl benzene vapor per 100 mols of air with a vanadium pentoxide catalyst promoted with a minor amount of potassium sulfate at a temperature of about 440–450° C. and at a contact time of 0.1 to 1 second.

LELAND K. BEACH.

REFERENCES CITED

The following references are of record in the file of this patent:

UNITED STATES PATENTS

| Number | Name | Date |
| --- | --- | --- |
| 1,284,887 | Gibbs | Nov. 12, 1918 |
| 2,206,377 | Weiss | July 2, 1940 |
| 2,289,036 | Parks et al. | July 7, 1942 |

FOREIGN PATENTS

| Number | Country | Date |
| --- | --- | --- |
| 237,688 | Great Britain | Aug. 6, 1925 |

OTHER REFERENCES

Smith et al.: J. Am. Chem. Soc., vol. 61, pp. 2398–2402 (1939).